(12) United States Patent
Zou et al.

(10) Patent No.: US 11,874,568 B2
(45) Date of Patent: Jan. 16, 2024

(54) DISPLAY PANEL AND DISPLAY DEVICE

(71) Applicant: HUIZHOU CHINA STAR OPTOELECTRONICS DISPLAY CO., LTD., Guangdong (CN)

(72) Inventors: Guangnan Zou, Guangdong (CN); Weiwei Zheng, Guangdong (CN); Zhuping Luo, Guangdong (CN); Zi Wang, Guangdong (CN)

(73) Assignee: HUIZHOU CHINA STAR OPTOELECTRONICS DISPLAY CO., LTD., Guangdong (CN)

( * ) Notice: Subject to any disclaimer, the term of this patent is extended or adjusted under 35 U.S.C. 154(b) by 120 days.

(21) Appl. No.: 17/600,291

(22) PCT Filed: May 27, 2021

(86) PCT No.: PCT/CN2021/096435
§ 371 (c)(1),
(2) Date: Sep. 30, 2021

(87) PCT Pub. No.: WO2022/233071
PCT Pub. Date: Nov. 10, 2022

(65) Prior Publication Data
US 2022/0390785 A1 Dec. 8, 2022

(30) Foreign Application Priority Data
May 7, 2021 (CN) .......................... 202110494268.5

(51) Int. Cl.
*G02F 1/1345* (2006.01)
*G02F 1/1333* (2006.01)

(52) U.S. Cl.
CPC ...... *G02F 1/13452* (2013.01); *G02F 1/13456* (2021.01); *G02F 1/13458* (2013.01); *G02F 1/133314* (2021.01); *G02F 1/133328* (2021.01)

(58) Field of Classification Search
CPC ....................................... G02F 1/13452–13458
See application file for complete search history.

(56) References Cited

U.S. PATENT DOCUMENTS

| | | | | |
|---|---|---|---|---|
| 2005/0088830 A1* | 4/2005 | Yumoto | ................. | H05K 1/147 |
| | | | | 174/254 |
| 2013/0082984 A1* | 4/2013 | Drzaic | ..................... | G09G 3/20 |
| | | | | 345/204 |

(Continued)

FOREIGN PATENT DOCUMENTS

| | | |
|---|---|---|
| CN | 107728365 A | 2/2018 |
| CN | 108681119 A | 10/2018 |

(Continued)

*Primary Examiner* — Dung T Nguyen
(74) *Attorney, Agent, or Firm* — Mark M. Friedman

(57) ABSTRACT

Embodiments of the present disclosure disclose a display panel and a display device. In the display panel, an array base plate is located on a light exit side of the display panel and includes a binding part. The binding part includes a plurality of binding terminals. A circuit board assembly is bound to the plurality of binding terminals and includes a plurality of electronic components. The circuit board assembly is bent to a side of a color film base plate that is away from the array base plate. Each of the electronic components is located on a side of the circuit board assembly that is away from the color film base plate.

16 Claims, 3 Drawing Sheets

(56) References Cited

U.S. PATENT DOCUMENTS

| | | | |
|---|---|---|---|
| 2013/0148072 A1* | 6/2013 | Jang | G02F 1/13452 349/150 |
| 2019/0086708 A1 | 3/2019 | Fan | |
| 2019/0129229 A1 | 5/2019 | Cui et al. | |

FOREIGN PATENT DOCUMENTS

| | | |
|---|---|---|
| CN | 208255589 U | 12/2018 |
| CN | 208367375 U | 1/2019 |
| CN | 110323231 A | 10/2019 |
| CN | 110335875 A | 10/2019 |
| CN | 110426877 A | 11/2019 |
| CN | 110488525 A | 11/2019 |
| CN | 111292614 A | 6/2020 |

\* cited by examiner

DISPLAY PANEL AND DISPLAY DEVICE

FIELD OF INVENTION

The present disclosure relates to the field of display technologies, and in particular, to a display panel and a display device.

BACKGROUND OF INVENTION

In a conventional display panel without frames on four sides, an array base plate is required to face a user. After a printed circuit board is bound, an electronic component on the printed circuit board is bent to a back face of the display panel and is located between the printed circuit board and a backlight module.

During the research and practice of the prior art, the inventor of the present disclosure finds that, since the electronic component is located between the printed circuit board and the backlight module, the display panel is not easily detected.

SUMMARY OF INVENTION

Technical Problem

Embodiments of the present disclosure provide a display panel and a display device, which facilitates detection of the display panel.

Technical Solution

An embodiment of the present disclosure provides a display panel, including:
- a color film base plate, located on a light entry side of the display panel;
- an array base plate, located on a light exit side of the display panel and including a binding part located in a non-display area, wherein the binding part includes a plurality of binding terminals;
- a liquid crystal (LC), disposed between the array base plate and the color film base plate; and
- a circuit board assembly, bound to the plurality of binding terminals and including a plurality of electronic components, wherein
- when the circuit board assembly is in a bent state, the circuit board assembly is bent to a side of the color film base plate that is away from the array base plate, and each of the electronic components is located on a side of the circuit board assembly that is away from the color film base plate.

Optionally, in some embodiments of the present disclosure, the circuit board assembly includes:
- a printed circuit board, including a first substrate and a plurality of first conductive pads, wherein the first substrate includes a first face and a second face disposed opposite to the first face, the plurality of first conductive pads are disposed on the first face, and each electronic component is disposed on the second face; and
- a flexible circuit board, wherein one end of the flexible circuit board is electrically connected to each of the binding terminals, and the other end of the flexible circuit board is electrically connected to each of the first conductive pads.

Optionally, in some embodiments of the present disclosure, the printed circuit board further includes a plurality of first traces and a plurality of conductors, the first traces are disposed on the second face, and the electronic components are connected to the first traces; and
- each first conductive pad is connected to one first trace using one conductor.

Optionally, in some embodiments of the present disclosure, holes in a one-to-one correspondence with the first conductive pads are provided on the first substrate, and each conductor is disposed in each hole.

Optionally, in some embodiments of the present disclosure, the first substrate further includes a side wall face connected to the first face and the second face, and each conductor is disposed on the side wall face.

Optionally, in some embodiments of the present disclosure, a material of the conductor is selected from one or a combination of metal, metallic oxide, and metal alloy.

Optionally, in some embodiments of the present disclosure, the flexible circuit board includes a second substrate, a second trace, a second conductive pad, and a third conductive pad, the second trace is disposed on the second substrate, the second conductive pad is connected to one end of the second trace, and the third conductive pad is connected to the other end of the second trace; and
- the second conductive pad is electrically connected to the binding terminal, and the third conductive pad is electrically connected to the first conductive pad.

Correspondingly, an embodiment of the present disclosure further provides a display device, including:
- a backlight module; and
- the display panel as described in the above embodiment and disposed on a light exit side of the backlight module, wherein
- when the circuit board assembly is in a bent state, the circuit board assembly is bent to a side of the backlight module that is away from the display panel, and each of the electronic components is located on a side of the circuit board assembly that is away from the backlight module.

Optionally, in some embodiments of the present disclosure, the display device further includes a fixing frame and a back panel, a first placing groove and a second placing groove are provided on the fixing frame, and the first placing groove is opposite to and communicates with the second placing groove; and
- the display panel is disposed in the first placing groove, the backlight module is disposed in the second placing groove, and the back panel is disposed on the side of the backlight module that is away from the display panel and located in the second placing groove.

Optionally, in some embodiments of the present disclosure, a circuit board assembly includes a printed circuit board and a flexible circuit board, the printed circuit board includes a first substrate and a plurality of first conductive pads, the first substrate includes a first face and a second face disposed opposite to the first face, the plurality of first conductive pads are disposed on the first face, and each electronic component is disposed on the second face; and
- the display device further includes an insulating adhesive layer, and the insulating adhesive layer is disposed on a side of the back panel that is away from the backlight module and connected to the first face.

Beneficial Effects

According to the embodiments of the present disclosure, when the circuit board assembly is in a bent state, the circuit board assembly is bent to the side of the color film base plate that is away from the array base plate, and the electronic component is located on the side of the circuit board assembly that is away from the color film base plate. In this way, the electronic component is exposed, facilitating detection of lines in the display panel.

BRIEF DESCRIPTION OF DRAWINGS

To describe the technical solutions in the embodiments of the present disclosure more clearly, the accompanying drawings required for describing the embodiments are briefly described hereinafter. Apparently, the accompanying drawings in the following descriptions show merely some embodiments of the present disclosure, and a person skilled in the art may obtain other accompanying drawings according to these accompanying drawings without creative efforts.

DETAILED DESCRIPTION OF PREFERRED EMBODIMENTS

The technical solutions of the embodiments of the present disclosure are clearly and completely described in the following with reference to the accompanying drawings of the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure. In addition, it should be understood that the specific implementations described herein are merely used for describing and illustrating the present disclosure, but are not intended to limit the present disclosure. In the present disclosure, unless otherwise stated, the directional terms such as "up" and "down" generally refer to directions when a device is in actual use or a working state, and specifically refer to drawing directions in the corresponding drawing; and "inside" and "outside" refer to positions relative to the contour of the device.

The embodiments of the present disclosure provide a display panel and a display device, which are described in detail below. It should be noted that, the description order of the following embodiments is not intended to limit preference orders of the embodiments.

Figure 1:
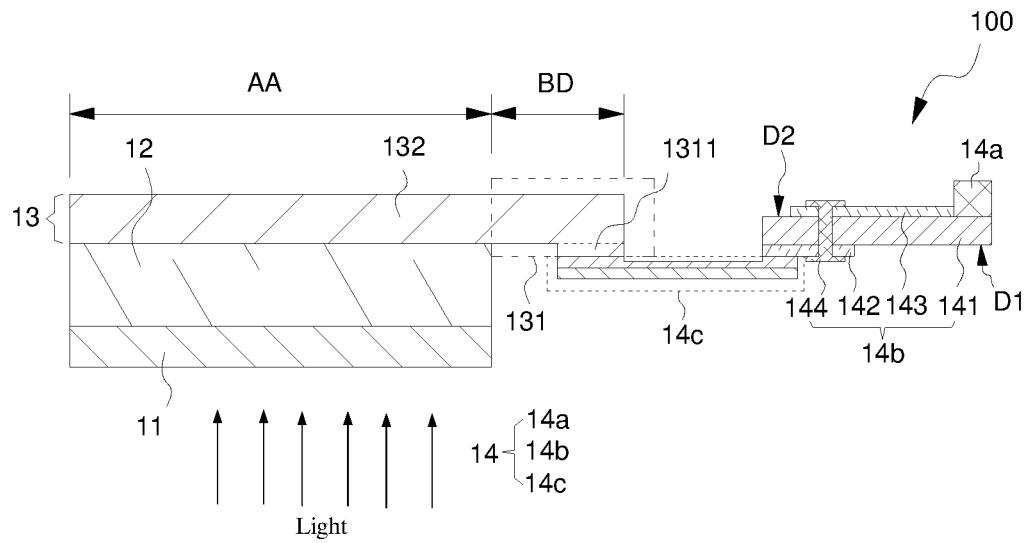
FIG. 1 is a schematic diagram of a structure of a display panel in a flat state according to an embodiment of the present disclosure.
Figure 2:
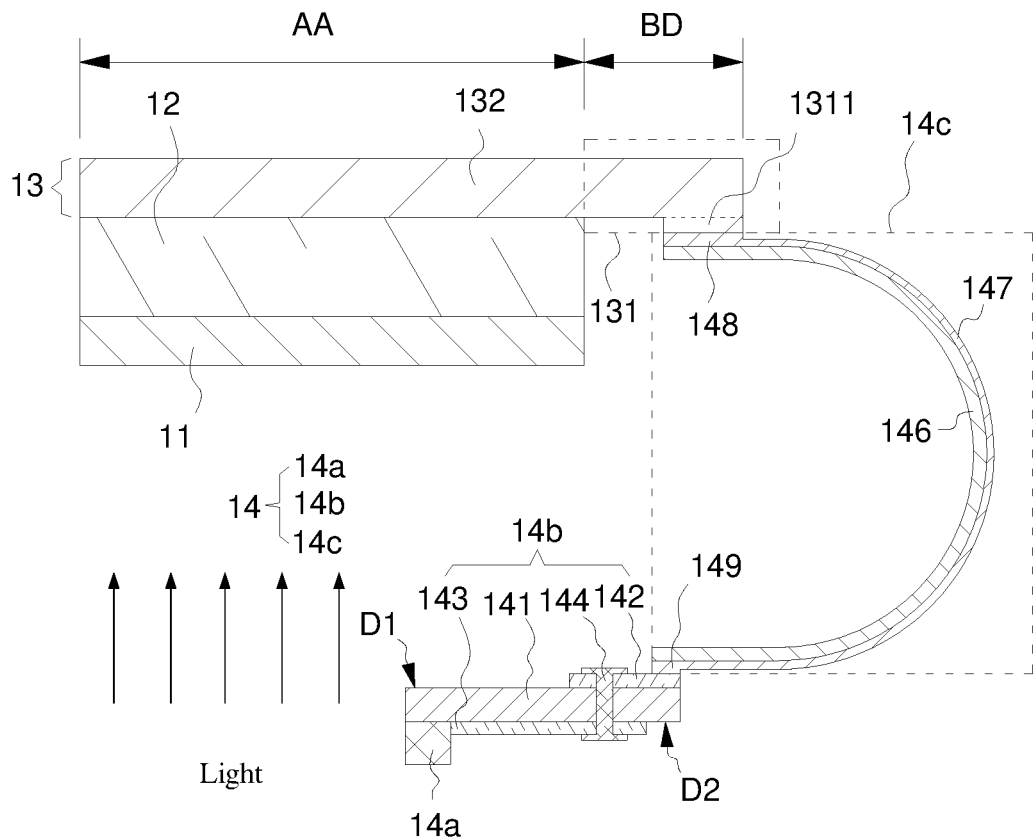
FIG. 2 is a schematic diagram of a structure of the display panel in a bent state according to an embodiment of the present disclosure.

Referring to FIG. 1 and FIG. 2, a display panel 100 provided in the embodiment of the present disclosure includes a color film base plate 11, an LC 12, an array base plate 13, and a circuit board assembly 14.

It should be noted that the display panel 100 may be a conventional display panel. That is to say, the color film base plate 11 includes a color film layer, and the array base plate 13 includes a circuit driving structure. The display panel 100 may also be applicable to a color filter on array (COA) display panel. That is to say, the color film layer is disposed on the array base plate 13, and the color film base plate 11 does not include the color film layer.

The color film base plate 11 is located on a light entry side of the display panel 100. The array base plate 13 is located on a light exit side of the display panel 100. The LC 12 is disposed between the color film base plate 11 and the array base plate 13.

The array base plate 13 includes a binding part 131 in a non-display area BD and a display part 132 in a display area AA. The binding part 131 includes a plurality of binding terminals 1311.

The circuit board assembly 14 is bound to the plurality of binding terminals 1311 and includes a plurality of electronic components 14a.

When the circuit board assembly 14 is in a bent state, the circuit board assembly 14 is bent to a side of the color film base plate 11 that is away from the array base plate 13. Each of the electronic components 14a is located on a side of the circuit board assembly 14 that is away from the color film base plate 11.

In the embodiment of the present disclosure, when the circuit board assembly 14 is in a bent state, the circuit board assembly 14 is bent to the side of the color film base plate 11 that is away from the array base plate 13. Each electronic component 14a is located on the side of the circuit board assembly 14 that is away from the color film base plate 11. In this way, the electronic component 14a is exposed, facilitating detection of lines in the display panel 100.

Figure 3:
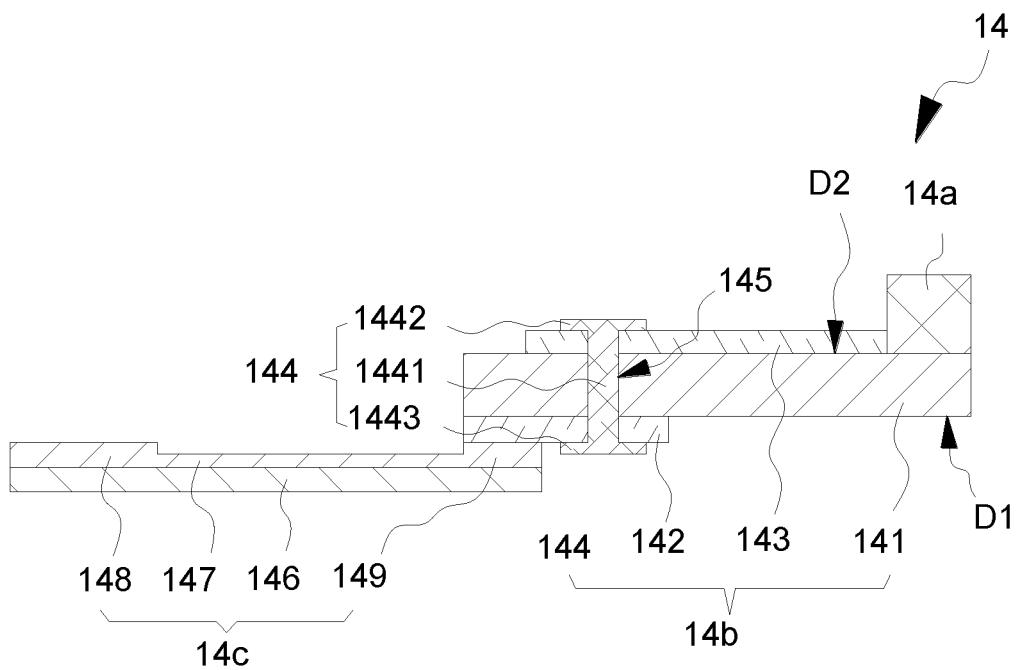
FIG. 3 is a schematic diagram of a structure of a circuit board assembly of the display panel according to an embodiment of the present disclosure.

Referring to FIG. 3, the circuit board assembly 14 further includes a printed circuit board 14b and a flexible circuit board 14c. One end of the flexible circuit board 14c is electrically connected to the binding part 131. Other end of the flexible circuit board 14c is electrically connected to the printed circuit board 14b.

Optionally, the flexible circuit board 14c may be a chip on film (COF), or may be a flexible printed circuit board having no chip disposed therein.

Optionally, the electronic component 14a includes but is not limited to a chip, a connector, a light-emitting diode (LED) lamp, and keys.

Figure 4:
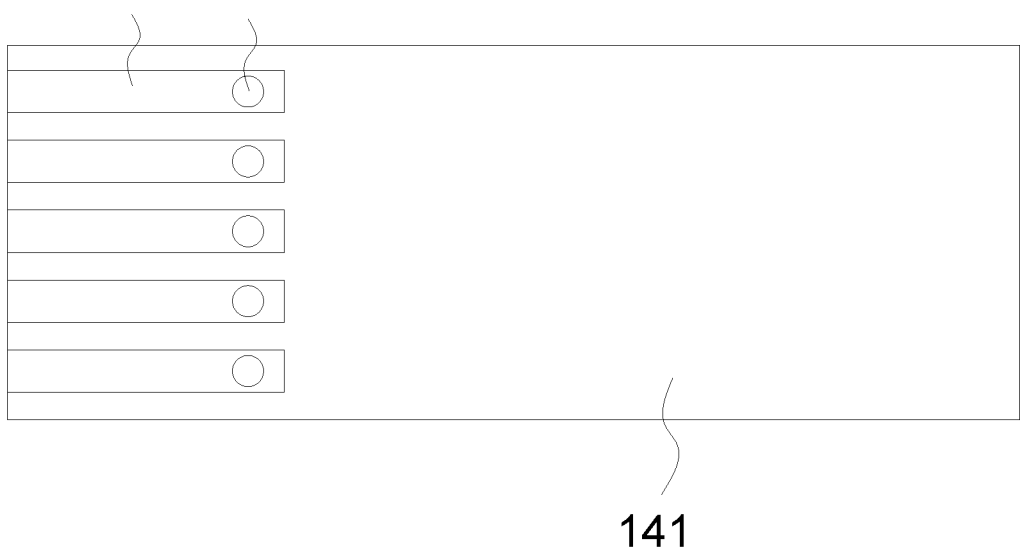
FIG. 4 is a schematic bottom view of a structure of a printed circuit board of the display panel according to an embodiment of the present disclosure.

Referring to FIG. 3 and FIG. 4, the printed circuit board 14b includes a first substrate 141, a plurality of first conductive pads 142, a plurality of first traces 143, and a plurality of conductors 144. The first substrate 141 includes a first face D1 and a second face D2 disposed opposite to the first face D1. The plurality of first conductive pads 142 are disposed on the first face D1. The electronic component 14a is disposed on the second face D2. The first traces 143 are disposed on the second face D2.

The electronic components 14a are connected to the first traces 143. The first traces 143 are connected to the first conductive pads 142. Each first conductive pad 142 is connected to one first trace 143 using one conductor 144.

The electronic component 14a and the first conductive pad 142 are disposed on different faces. When the array base plate 13 is used as a light exit side of the display panel 100, the electronic component 14a is exposed, which facilitates the detection and maintenance of lines.

Optionally, holes 145 in a one-to-one correspondence with the first conductive pads 142 are provided on the first substrate 141, and each conductor 144 is disposed in each hole 145.

Optionally, the conductor 144 includes a first portion 1441, a second portion 1442, and a third portion 1443. The first portion 1441 is disposed in the hole 145. The second portion 1442 is connected to one end of the first portion 1441 and covers a part of the first trace 143. The third portion 1443 is connected to the other end of the first portion 1441 and covers a part of the first conductive pad 142.

The arrangement of the second portion 1442 and the third portion 1443 improves the stability of connection of the conductor 144 to the first trace 143 and the first conductive pad 142. In addition, the second portion 1442 covers the part of the first trace 143, and the third portion 1443 covers the part of the first conductive pad 142. In this way, a connection area of the conductor 144 and the first conductive pad 142 and a connection area of the conductor 144 and the first trace 143 are increased, thereby reducing impedance.

Optionally, a material of the conductor 144 is selected from one or a combination of metal, metallic oxide, and metal alloy.

One end of the flexible circuit board 14c is electrically connected to each binding terminal 1311. The other end of the flexible circuit board 14c is electrically connected to the first conductive pad 142. The flexible circuit board 14c includes a second substrate 146, a second trace 147, a second conductive pad 148, and a third conductive pad 149.

The second trace 147 is disposed on the second substrate 146. The second conductive pad 148 is connected to one end of the second trace 147, and the third conductive pad 149 is connected to the other end of the second trace 147.

The second conductive pad 148 is electrically connected to the binding terminal 1311. The third conductive pad 149 is electrically connected to the first conductive pad 142.

Optionally, the conductor 144 is disposed on an outer side of the third conductive pad 149. That is to say, the conductor 144 is prevented from overlapping the third conductive pad 149, thereby improving the connection stability and electrical performance of the first conductive pad 142 and the third conductive pad 149.

Optionally, materials of the binding terminal 1311, the first conductive pad 142, the second conductive pad 148, and the third conductive pad 149 may each include one or a combination of metal, metallic oxide, and metal alloy, such as copper, indium tin oxide, copper/titanium alloy, and the like.

The binding terminal 1311 is connected to the second conductive pad 148 using a conductive adhesive. The first conductive pad 142 is connected to the third conductive pad 149 using the conductive adhesive.

Figure 5:
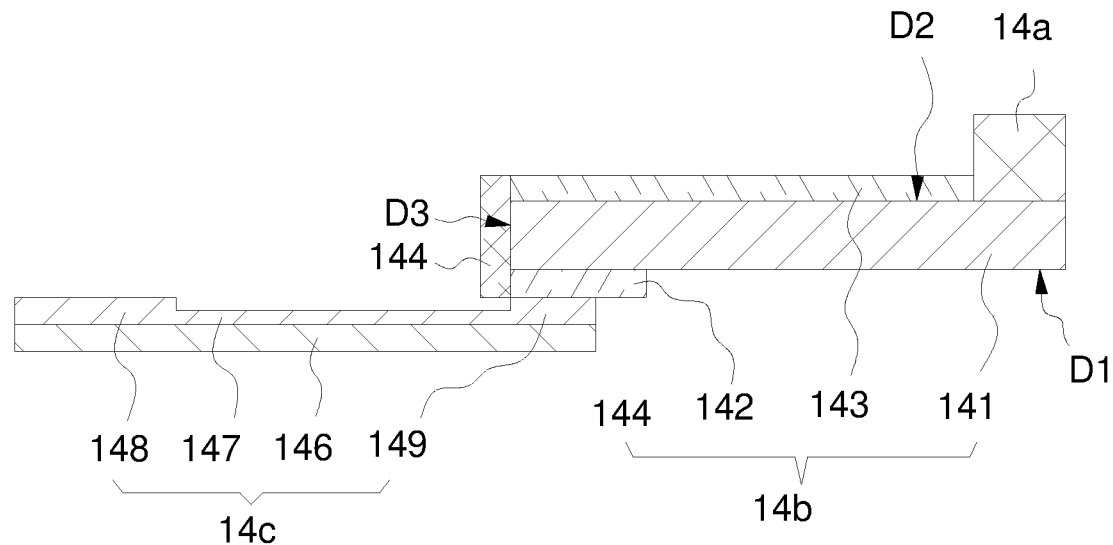
FIG. 5 is a schematic diagram of another structure of the circuit board assembly of the display panel according to an embodiment of the present disclosure.

Optionally, in some embodiments, referring to FIG. 5, a difference between the embodiment and the foregoing embodiments is that positions of the conductors 144 are different. In detail, the first substrate 141 further includes a side wall face D3 connected to the first face D1 and the second face D2, and the conductor 144 is disposed on the side wall face D3.

The conductor 144 may be disposed on the side wall face D3 by means of transfer print. Disposing the conductor 144 on the side wall face D3 prevents holes from being formed on the first substrate 141. This is a relatively simplified process.

A preparation process of the display panel 100 of the present embodiment includes steps as follows.

The color film base plate 11, the LC 12, and the array base plate 13 are first assembled to form an LC cell. One end of the flexible circuit board 14c is then bound to the binding part 131 of the array base plate 13. Next, the LC cell is fixed to a first platform, and the printed circuit board 14b having the electronic component 14a assembled therein is fixed to a second platform. A plurality of avoidance grooves are provided on the second platform, and the electronic component 14a is disposed in each avoidance groove. Second, the flexible circuit board 14c is aligned to the first conductive pad 142. Then a pressure head is used to press the flexible circuit board 14c and the first conductive pad 142 to fixedly connect the flexible circuit board to the first conductive pad. In this way, the binding of the display panel 100 is completed. Finally, the flexible circuit board 14c is bent, and the printed circuit board 14b and the electronic component 14a are folded to the back face of the color film base plate 11, so that the electronic component 14a is exposed, which facilitates plugging of lines and line tests.

Figure 6:
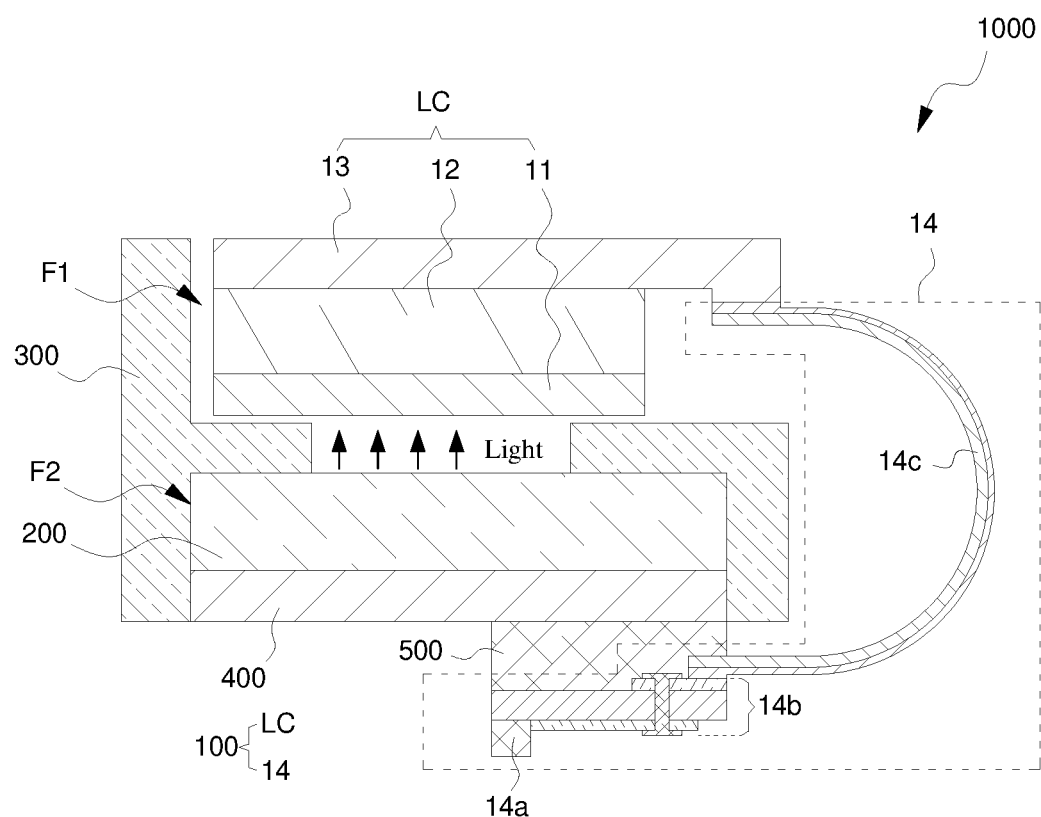
FIG. 6 is a schematic diagram of a structure of a display device according to an embodiment of the present disclosure.

Referring to FIG. 6, correspondingly, the embodiment of the present disclosure further provides a display device 1000. The display device includes the display panel 100, the backlight module 200, the fixing frame 300, and the back panel 400 in the above embodiment.

The display panel 100 is disposed on a light exit side of the backlight module 200. A first placing groove F1 and a second placing groove F2 are provided on the fixing frame 300. The first placing groove F1 is opposite to and communicates with the second placing groove F2.

An LC cell of the display panel 100 is disposed in the first placing groove F1. The backlight module 200 is disposed in the second placing groove F2. The back panel 400 is disposed on a side of the backlight module 200 that is away from the display panel 100 and is located in the second placing groove F2.

The display panel of the display device 1000 is the display panel 100 of the above embodiment. For details of the display panel 100, refer to the content of the display panel 100 in the above embodiment.

Optionally, the backlight module 200 may be a direct-lit backlight module, or may be a side-in backlight module. Since the backlight module 200 is the prior art, details will be not described herein again.

Optionally, the fixing frame 300 may be an adhesive frame. The back panel 400 may be a metal back panel, such as an iron back panel.

When the circuit board assembly 14 is in a bent state, the circuit board assembly 14 is bent to the side of the backlight module 200 that is away from the display panel 100. The electronic component 14a is located on the side of the circuit board assembly 14 that is away from the backlight module 200.

Referring to FIG. 3 and FIG. 4, the printed circuit board 14b includes a first substrate 141, a plurality of first conductive pads 142, a plurality of first traces 143, and a plurality of conductors 144. The first substrate 141 includes a first face D1 and a second face D2 disposed opposite to the first face D1. The plurality of first conductive pads 142 are disposed on the first face D1. The electronic component 14a is disposed on the second face D2. The first traces 143 are disposed on the second face D2.

The electronic components 14a are connected to the first traces 143. The first traces 143 are connected to the first conductive pads 142. Each first conductive pad 142 is connected to one first trace 143 using one conductor 144.

The electronic component 14a and the first conductive pad 142 are disposed on different faces. When the array base plate 13 is used as a light exit side of the display panel 100, the electronic component 14a is exposed, which facilitates the detection and maintenance of lines.

Optionally, holes 145 in a one-to-one correspondence with the first conductive pads 142 are provided on the first substrate 141, and each conductor 144 is disposed in each hole 145.

Optionally, the conductor 144 includes a first portion 1441, a second portion 1442, and a third portion 1443. The first portion 1441 is disposed in the hole 145. The second portion 1442 is connected to one end of the first portion 1441 and covers a part of the first trace 143. The third portion 1443 is connected to the other end of the first portion 1441 and covers a part of the first conductive pad 142.

The arrangement of the second portion 1442 and the third portion 1443 improves the stability of connection of the conductor 144 to the first trace 143 and the first conductive pad 142. In addition, the second portion 1442 covers the part of the first trace 143, and the third portion 1443 covers the part of the first conductive pad 142. In this way, a connection area of the conductor 144 and the first conductive pad 142 and a connection area of the conductor 144 and the first trace 143 are increased, thereby reducing impedance.

Optionally, a material of the conductor 144 is selected from one or a combination of metal, metallic oxide, and metal alloy.

One end of the flexible circuit board 14c is electrically connected to each binding terminal 1311. The other end of the flexible circuit board 14c is electrically connected to the first conductive pad 142. The flexible circuit board 14c includes a second substrate 146, a second trace 147, a second conductive pad 148, and a third conductive pad 149.

The second trace 147 is disposed on the second substrate 146. The second conductive pad 148 is connected to one end of the second trace 147, and the third conductive pad 149 is connected to the other end of the second trace 147.

The second conductive pad 148 is electrically connected to the binding terminal 1311. The third conductive pad 149 is electrically connected to the first conductive pad 142.

Optionally, the conductor 144 is disposed on an outer side of the third conductive pad 149. That is to say, the conductor 144 is prevented from overlapping the third conductive pad 149, thereby improving the connection stability and electrical performance of the first conductive pad 142 and the third conductive pad 149.

Optionally, in some embodiments, referring to FIG. 5, a difference between the embodiment and the foregoing embodiments is that positions of the conductors 144 are different. In detail, the first substrate 141 further includes a side wall face D3 connected to the first face D1 and the second face D2, and the conductor 144 is disposed on the side wall face D3.

The conductor 144 may be disposed on the side wall face D3 by means of transfer print. Disposing the conductor 144 on the side wall face D3 prevents holes from being formed on the first substrate 141. This is a relatively simplified process.

The display device 1000 further includes an insulating adhesive layer 500. The insulating adhesive layer 500 is disposed on the side of the back panel 400 that is away from the backlight module 200 and connected to the first face D1.

According to the display device 1000 of the embodiments of the present disclosure, the flexible circuit board 14c is bent to fold the printed circuit board 14b and the electronic component 14a to the back face of the color film base plate 400, and the electronic component 14a is exposed. This facilitates the detection of lines in the display panel, and a risk of short circuits of the electronic component 14a and the back panel 400 is also avoided.

A display panel and a display device provided in the embodiments of the present disclosure are described above in detail. Although the principles and implementations of the present disclosure are described by using specific examples in this specification, the descriptions of the foregoing embodiments are merely used for helping understand the method and the core idea of the method of the present disclosure. Meanwhile, a person of ordinary skill in the art may make modifications to the specific implementations and application range according to the ideas of the present disclosure. In conclusion, the content of the specification is not to be construed as a limitation to the present disclosure.

What is claimed is:

1. A display panel, comprising:
    a color film base plate, located on a light entry side of the display panel;
    an array base plate, located on a light exit side of the display panel and comprising a binding part located in a non-display area, wherein the binding part comprises a plurality of binding terminals;
    a liquid crystal (LC), disposed between the array base plate and the color film base plate; and
    a circuit board assembly, bound to the plurality of binding terminals and comprising a plurality of electronic components, wherein
    when the circuit board assembly is in a bent state, the circuit board assembly is bent to a side of the color film base plate that is away from the array base plate, and each of the electronic components is located on a side of the circuit board assembly that is away from the color film base plate,
    wherein the circuit board assembly comprises:
    a printed circuit board, comprising a first substrate, a plurality of first conductive pads, a plurality of first traces, and a plurality of conductors, wherein the first substrate comprises a first face and a second face disposed opposite to the first face, the plurality of first conductive pads are disposed on the first face, and each of the electronic components is disposed on the second face; and
    a flexible circuit board, wherein one end of the flexible circuit board is electrically connected to each of the binding terminals, and other end of the flexible circuit board is electrically connected to each of the first conductive pads, and
    wherein the first traces are disposed on the second face, and the electronic components are connected to the first traces; and
    each of the first conductive pads is connected to one of the first traces using one of the conductors.

2. The display panel as claimed in claim 1, wherein holes in a one-to-one correspondence with the first conductive pads are provided on the first substrate, and each of the conductors is disposed in one of the holes.

3. The display panel as claimed in claim 1, wherein the first substrate further comprises a side wall face connected to the first face and the second face, and each of the conductors is disposed on the side wall face.

4. The display panel as claimed in claim 1, wherein a material of the conductor is selected from one or a combination of metal, metallic oxide, and metal alloy.

5. The display panel as claimed in claim 1, wherein the flexible circuit board comprises a second substrate, a second trace, a second conductive pad, and a third conductive pad, the second trace is disposed on the second substrate, the second conductive pad is connected to one end of the second trace, and the third conductive pad is connected to an other end of the second trace; and the second conductive pad is electrically connected to the binding terminal, and the third conductive pad is electrically connected to the first conductive pad.

6. The display panel as claimed in claim 2, wherein each of the conductors comprises a first portion, a second portion, and a third portion, the first portion is disposed in the hole, the second portion is connected to one end of the first portion and covers a part of the first trace, and the third portion is connected to an other end of the first portion and covers a part of the first conductive pad.

7. The display panel as claimed in claim 1, wherein the flexible circuit board is a chip on film (COF).

8. A display device, comprising:
a backlight module; and
a display panel, disposed on a light exit side of the backlight module, wherein
the display panel comprises:
a color film base plate, located on a light entry side of the display panel;
an array base plate, located on a light exit side of the display panel and comprising a binding part located in a non-display area, wherein the binding part comprises a plurality of binding terminals;
a liquid crystal (LC), disposed between the array base plate and the color film base plate; and
a circuit board assembly, bound to the plurality of binding terminals and comprising a plurality of electronic components, wherein
when the circuit board assembly is in a bent state, the circuit board assembly is bent to a side of the backlight module that is away from the display panel, and each of the electronic components is located on a side of the circuit board assembly that is away from the backlight module,
wherein the circuit board assembly comprises:
a printed circuit board, comprising a first substrate, a plurality of first conductive pads, a plurality of first traces, and a plurality of conductors, wherein the first substrate comprises a first face and a second face disposed opposite to the first face, the plurality of first conductive pads are disposed on the first face, and each of the electronic components is disposed on the second face; and
a flexible circuit board, wherein one end of the flexible circuit board is electrically connected to each of the binding terminals, and other end of the flexible circuit board is electrically connected to each of the first conductive pads, and wherein the first traces are disposed on the second face, and the electronic components are connected to the first traces; and each of the first conductive pads is connected to one of the first traces using one of the conductors.

9. The display device as claimed in claim 8, wherein the display device further comprises a fixing frame and a back panel, a first placing groove and a second placing groove are provided on the fixing frame, and the first placing groove is opposite to and communicates with the second placing groove; and the display panel is disposed in the first placing groove, the backlight module is disposed in the second placing groove, and the back panel is disposed on the side of the backlight module that is away from the display panel and located in the second placing groove.

10. The display device as claimed in claim 9, wherein the display device further includes an insulating adhesive layer, and the insulating adhesive layer is disposed on a side of the back panel that is away from the backlight module and connected to the first face.

11. The display device as claimed in claim 10, wherein holes in a one-to-one correspondence with the first conductive pads are provided on the first substrate, and each of the conductors is disposed in one of the holes.

12. The display device as claimed in claim 11, wherein each of the conductors comprises a first portion, a second portion, and a third portion, the first portion is disposed in the hole, the second portion is connected to one end of the first portion and covers a part of the first trace, and the third portion is connected to an other end of the first portion and covers a part of the first conductive pad.

13. The display device as claimed in claim 10, wherein the first substrate further comprises a side wall face connected to the first face and the second face, and each of the conductors is disposed on the side wall face.

14. The display device as claimed in claim 10, wherein a material of the conductor is selected from one or a combination of metal, metallic oxide, and metal alloy.

15. The display device as claimed in claim 10, wherein the flexible circuit board comprises a second substrate, a second trace, a second conductive pad, and a third conductive pad, the second trace is disposed on the second substrate, the second conductive pad is connected to one end of the second trace, and the third conductive pad is connected to an other end of the second trace; and the second conductive pad is electrically connected to the binding terminal, and the third conductive pad is electrically connected to the first conductive pad.

16. The display device as claimed in claim 10, wherein the flexible circuit board is a chip on film (COF).

* * * * *